United States Patent [19]

Evans

[11] Patent Number: 5,573,405

[45] Date of Patent: Nov. 12, 1996

[54] BEHAVIOR MONITORING AND TRAINING DEVICE

[76] Inventor: Suzanne Evans, 222 Richards St., Geneva, Ill. 60134

[21] Appl. No.: 254,407

[22] Filed: Jun. 3, 1994

[51] Int. Cl.$^6$ ................................................ G09B 19/00
[52] U.S. Cl. .......................... 434/238; 434/407; 116/325; 116/326
[58] Field of Search .................................. 434/238, 236, 434/107, 108, 109, 407; 116/325, 326, 222; 235/90

[56] References Cited

U.S. PATENT DOCUMENTS

| | | | |
|---|---|---|---|
| 2,414,614 | 1/1947 | Shurick | 434/238 |
| 2,512,485 | 6/1950 | Cougias | 434/238 |
| 2,863,603 | 12/1958 | Doupnik | 434/238 |
| 2,883,765 | 4/1959 | Blaine . | |
| 2,965,978 | 12/1960 | Olson | 434/238 |
| 3,035,355 | 5/1962 | Holmes | 434/238 |
| 3,596,388 | 8/1971 | Shorten | 434/109 X |
| 3,780,009 | 9/1972 | Darnell | 434/238 |
| 3,780,695 | 12/1973 | Richard | 434/108 X |
| 4,111,418 | 9/1978 | DeMent, Jr. . | |
| 4,741,701 | 5/1988 | Kossor . | |
| 5,176,521 | 1/1993 | McRae | 434/407 |
| 5,257,940 | 11/1993 | Schaarschmidt | 434/238 X |
| 5,470,235 | 11/1995 | Papaleo | 434/238 |

OTHER PUBLICATIONS

Cleo Learning Aids catelog, 1976, pp. 39 and 68.
Toys to Grow On catelog, 1990, p. 18.

Primary Examiner—Jessica J. Harrison
Assistant Examiner—Michael O'Neill
Attorney, Agent, or Firm—McAndrews, Held & Malloy, Ltd.

[57] ABSTRACT

A behavoir training and modification device includes a board having a plurality of pegs extending from its front face. The pegs are arranged in a predetermined pattern such as a grid of rows and columns. Indicator plates can be marked with visual indicia representing individuals, task, behaviors. The indicator plates include apertures to permit so they can be slid onto the pegs. The plates are positioned on the board to assign tasks to specific individuals and to indicate behavior traits to be modified. Status indicator plates are used to acknowledge the completion of tasks, and the manifestation of desirable and undesirable behavior. Transparent plates are provided so that when multiple plates are stacked on a single peg the plates lower in the stack are visible through the upper plates in the stack.

16 Claims, 5 Drawing Sheets

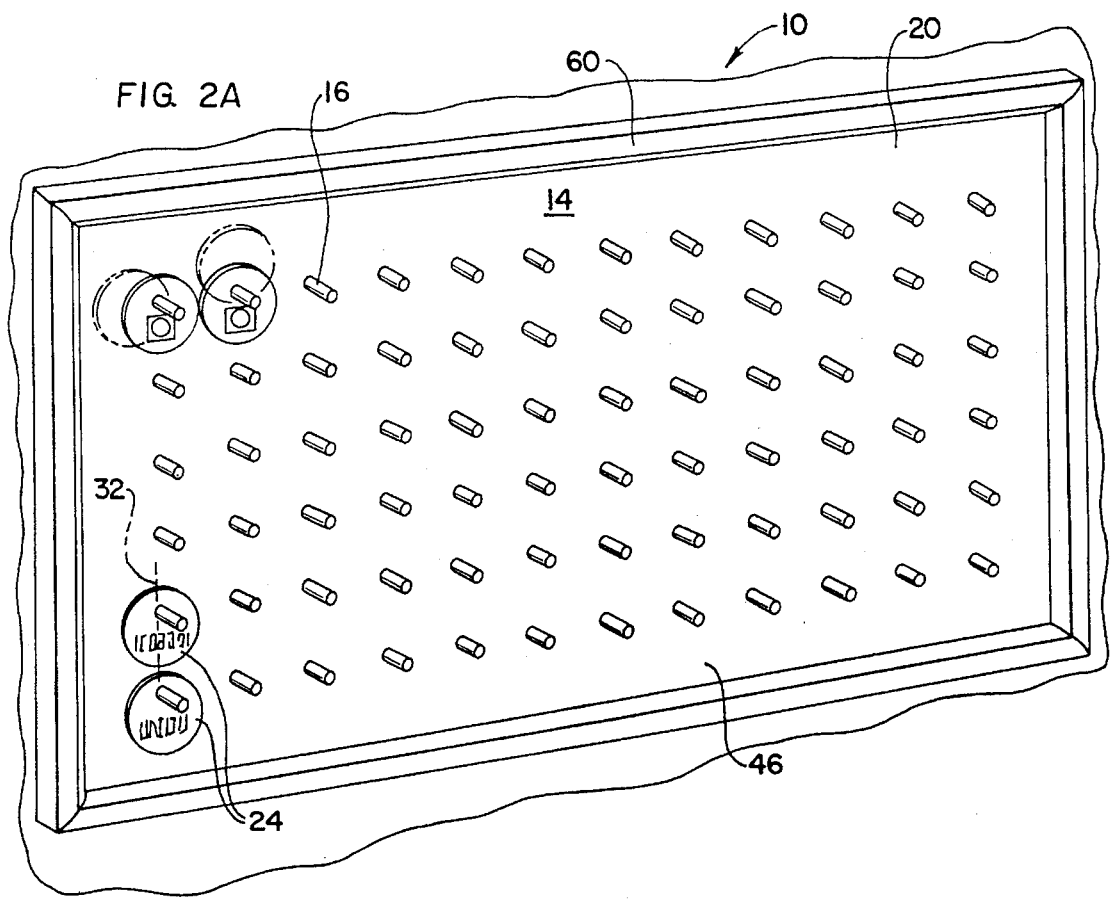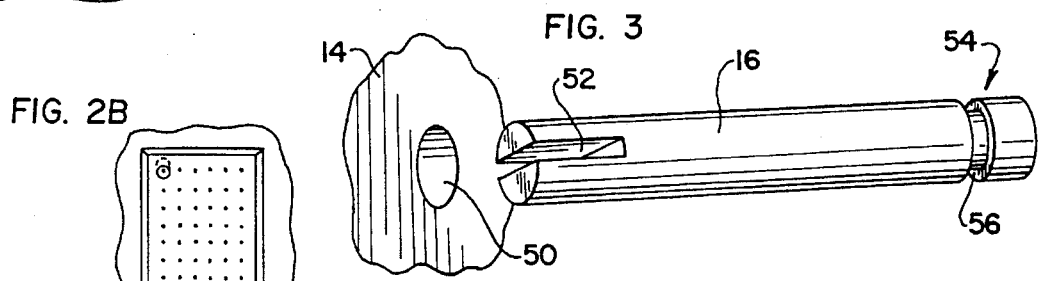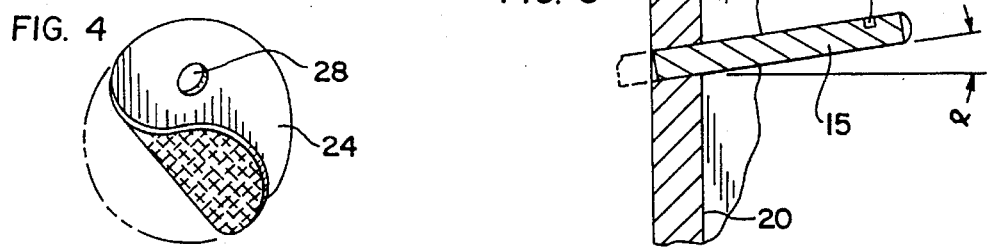

BEHAVIOR MONITORING AND TRAINING DEVICE

FIELD OF THE INVENTION

The present invention relates generally to a training device and, more particularly, to a device for encouraging individuals in the development of responsibility and character. The invention is especially suited for use with children.

BACKGROUND OF THE INVENTION

In the field of psychology, and especially in the area of behavior modification, the importance of providing "feedback", i.e., readily-understood information concerning the impact of behavior, has been long recognized. Feedback enables a person to know whether or not his or her behavior is acceptable, and helps the person to control his or her impulses to behave inappropriately. Thus, feedback helps the person to anticipate the response which will be given to his or her behavior by others.

"Report cards" have long been used to provide visual feedback to students, concerning their behavior in school classrooms. At home, parents have used a "checklist" of their children's responsibilities to aid in determining whether their children have earned their allowance money or other rewards. Various types of consumer products have appeared which are intended to assist parents in monitoring and managing their children's behavior.

Authoritative sources agree that any disciplinary procedure must be administered fairly if the child is to develop his or own internal sense of right and wrong. It is also widely agreed that any discipline procedure which is administered too long after the corresponding behavior is less effective than discipline which is administered promptly. With the increased publicity given to the problem of child abuse, parents today are understandably wary of using corporal punishment, and there is a substantial body of evidence to support the proposition that corporal punishment is less effective in making long-term changes in behavior than other types of discipline. The denial or suspension of privileges, in proportion to the severity of the behavior exhibited, is considered to be the best response to most types of undesirable behavior.

In response to the need to provide a behavior training and modification device, the applicant has developed and sold the device shown in FIG. 1. This device has been commercially available from Practical Encouragement and Guidance Systems in Geneva, Ill. since 1992. As can be seen in FIG. 1, the device is in the form of a board having a plurality of pegs arranged to form a grid of rows and columns. Indicator plates can be marked with visual indicia representing individuals, tasks, and behaviors. The indicator plates include apertures so they can be slid onto the pegs. The plates are positioned on the board to assign tasks to specific individuals and to indicate behavior traits to be modified. Status indicator plates are used to acknowledge the completion of tasks, and the manifestation of desirable and undesirable behavior.

An instruction book provided with the device discloses dividing the board into a task section and a behavior section. The task section includes a row of pegs for receiving task plates indicating tasks to be performed and assignment rows for each individual responsible for performing the designated tasks. Status plates are placed on the pegs in the assignment rows to indicate the status of the tasks assigned to a respective individual.

Similarly, the behavior section includes a first row of pegs for receiving behavior plates indicating behaviors to be modified and a row of pegs for each individual whose behavior is to be modified. The first row of the behavior section can be divided into a first section in which a behavior plates corresponding to existing behaviors are placed and a second section in which behavior plates corresponding to a desired behaviors are placed. Status plates are placed on the pegs in individual rows to indicate the status of the individual's behavior.

This device suffers from several drawbacks. First, the board can only be used in one orientation because the pegs in the upper row are positioned too close to the frame to permit the board to be rotated ninety degrees. Second, if multiple disks are placed on a single peg, only the top disk in the stack is visible. Finally, the device does not disclose any mechanism for immediately signaling a reversal from good to bad or bad to good.

The present invention is directed to overcoming one or more of the above-noted problems. Other objects will become apparent upon reading the following detailed description and appended claims, and upon reference to the accompanying drawings.

SUMMARY OF THE INVENTION

In accordance with one aspect of the present invention, a monitoring device comprises a board having a plurality of pegs extending outwardly from its front face. The pegs are arranged in a predetermined pattern, such as a grid. Indicator plates can be marked with visible indicia and include apertures to permit them to slide onto the pegs. At least some of the indicator plates are transparent so that when multiple plates are stacked on a single peg, the plates lower in the stack are visible through the upper plates in the stack.

According to another aspect of the present invention, a monitoring device comprises a board having a plurality of pegs extending from its front face. The pegs are equally spaced from one another and arranged in a grid of rows and columns. Indicator plates can be marked with visible indicia and include apertures formed along their central axis which permit the plates to slide onto the pegs. The pegs forming the outer rows and columns of the grid are spaced from the edges of the board by a predetermined distance which exceeds one-half the width of the plates to provide a border of "pegless" material. This border permits the board to be mounted in any orientation without the plates overhanging the edges of the board.

According to yet another aspect of the present invention the pegs are angled upwardly with respect to the front face of the board.

According to still another aspect of the present invention at least some of the indicator plates are reversible, having a first color on one side and a second color on the other side.

BRIEF DESCRIPTION OF THE DRAWINGS

For a more complete understanding of this invention reference should now be had to the embodiment illustrated in greater detail in the accompanying drawings and described below by way of example of the invention.

In the drawings:

FIG. 2 is a perspective view of a monitoring device in accordance with the present invention;

FIG. 2B is a front perspective view of the monitoring device of FIG. 2 rotated 90°;

FIG. 3 illustrates a peg having a split end;

FIG. 4 illustrates a reversible indicator plate used in connection with the training device of FIG. 2;

FIG. 5 illustrates the use of angled pegs in connection with the device of FIG. 2;

DETAILED DESCRIPTION OF THE PREFERRED EMBODIMENTS

Figure 1:
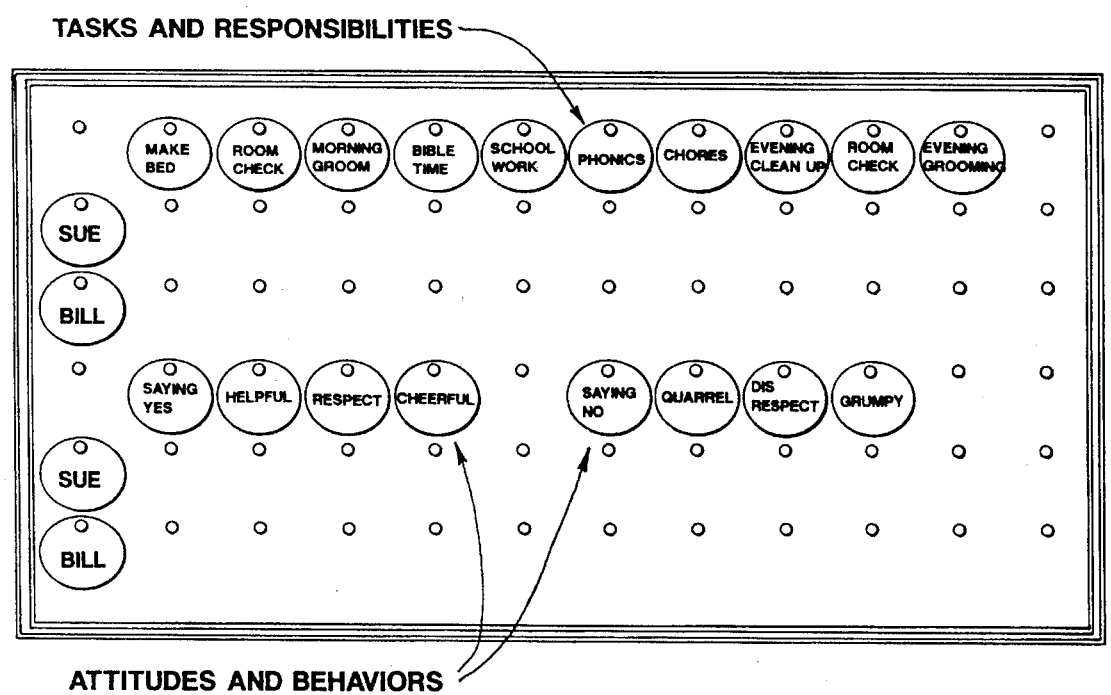
FIG. 1 is a front view of a prior art device.

In the following detailed description, spatially orienting terms are used such as "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Referring now to FIG. 2, a monitoring device 10 includes a board 14 having a plurality of pegs 16 extending from its front face. Although the monitoring device is described in connection with behavior training and modification for children, it should be appreciated that the device has numerous other uses, such as monitoring the status of projects within a company. Pegs 14 are equally spaced from one another, both laterally and horizontally, and are arranged in a grid of rows and columns. The pegs can also be arranged in patterns, such as a company logo. In the illustrated embodiment there are six rows with twelve pegs per row. The pegs are laterally and vertically spaced at 1⅞ inches between peg centers. It should be appreciated, however, that the number of rows and columns between pegs, as well as the peg spacing, can vary in accordance with the needs of the users.

A plurality of indicator plates 24 are provided and they may be marked with visual indicia representing individuals, tasks, or behaviors. Each indicator plate 24 includes an aperture 28 (see, e.g., FIG. 4) so that the plate may be slid onto a peg 16. In the preferred embodiment, each aperture 28 is slightly larger that the peg's diameter of 3/16 inches and is located along the central axis 32 (see FIG. 2) of a plate 24 so that the plate 24 hangs evenly on a peg 16.

Plates 24 are positionable on board 14 to assign tasks to a specific individual and to indicate behavior traits to be modified. Status plates are used to acknowledge the completion of tasks and the manifestation of desirable and undesirable behavior. Transparent plates (see FIG. 6) are provided so that when multiple plates are stacked on a single peg the plates lower in the stack are visible through the upper plates.

Although indicator plates 24 are illustrated as circular disks, it is to be understood they could come in other shapes such as rectangles, squares, or octagons. Plates 24 may also be shaped as recognizable symbols such as a stop sign or a company logo.

Figure 7:
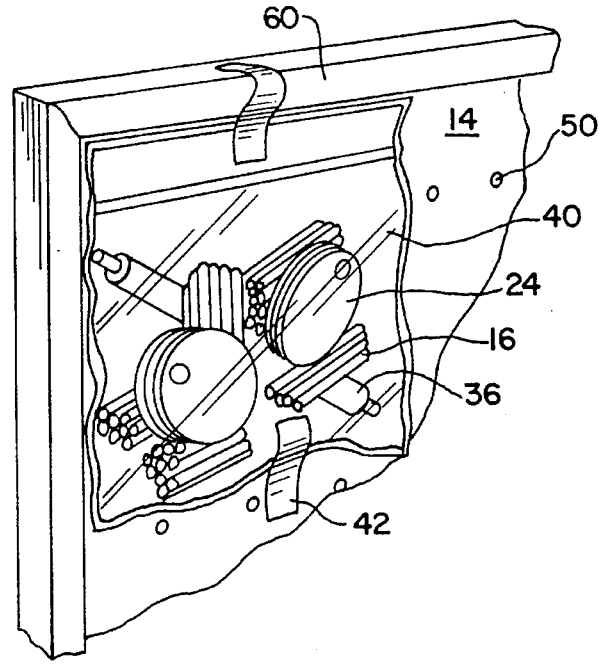
FIG. 7 is a schematic illustration of the training device of FIG. 2 in kit form.
Figure 11:
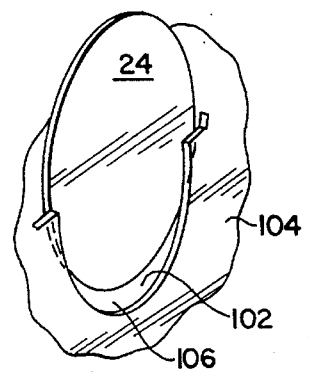
FIG. 11 illustrates a slotted board in accordance with an embodiment of the present invention.

Preferably, monitoring device 10 comes as a kit consisting of board 14, a plurality of pegs 16, a plurality of indicator plates 24, a plurality of adhesive stickers (not shown), and a water soluble or dry erase marker 36, as illustrated in FIG. 7. The pegs 16, plates 24, stickers, marker 36, and printed instructions are sealed in a plastic bag 40 which is removably attached to the board 14 by adhesive tape 42, for example. As shown in FIG. 3, board 14 includes pre-drilled holes 50 sized to receive pegs 16 in interference fit and spaced apart in accordance with a predetermined pattern. The end user assembles board 14 by inserting pegs 14 into holes 50. One end of pegs 16 may include a transverse split 52 to ease insertion of a peg 16 into the board 14. (See FIG. 3). It should be appreciated that the pegs can also include threads which threadably engage reciprocal threaded holes in the board 14. Alternatively, (as shown in FIG. 11) pegs 16 and board 14 may be integrally molded from a material such as polyvinyl chloride (PVC). As shown in FIG. 3, the outer ends 54 of each peg 14 may include a notch 56 or groove to prevent disks 24 from sliding off peg 14. Preferably, the notch 56 is annular as shown in FIG. 3. Alternatively, the notch 56 can be formed only in the top side of the peg, as shown in FIG. 5.

Board 14 includes a flat, planar sheet 46 of material surrounded on its outer edges by a frame 60 which extends laterally beyond the front face of sheet 46 by approximately ⅜ inches and the back face of the sheet by approximately 1 inch. Besides being aesthetically pleasing, frame 60 permits board 14 to be mounted on a wall using convention means such as nails, screws mounting brackets, etc. Pegs 16 are approximately 2 inches long and when inserted into board 14, pegs 16 extend approximately ⅞ inches beyond the board's front face 20 (FIG. 5). The inner or proximal ends of the pegs 14 extend completely through board 14 and align with the back edge of the frame 60.

Board 14 is generally rectangular and may be made available in three sizes—a small board is approximately 24 inches by 12½ inches, a medium sized board is 24 inches by 19½ inches and a large board is 24 inches by 26½ inches. It should be appreciated that board 14 may readily be configured in other sizes and shapes. The front face 20 of the board is preferably white, slick and nonporous to permit removal of markings made with the marker 36. A suitable material for the planar sheet 46 is laminated tileboard, which is generally available at local lumberyards. Another suitable material for the planar sheet 46 is melamine, which is also generally available at local lumberyards and is often used to make dry-erase "chalkboards." Alternatively, the board may be constructed of a finished wood such as oak or maple.

Preferably, pegs 16 extend perpendicularly to the front face 20 of board 14 so that the board may be wall-mounted in a variety of orientations, e.g. with six rows of twelve pegs (see FIG. 2) or with twelve rows of six pegs. Alternatively, pegs 16 may be angled upwardly as illustrated in FIG. 5. Such a design is beneficial for retaining plates 24 on pegs 16, but is undesirable in some instances because it limits board 14 to a single orientation.

Figure 8:
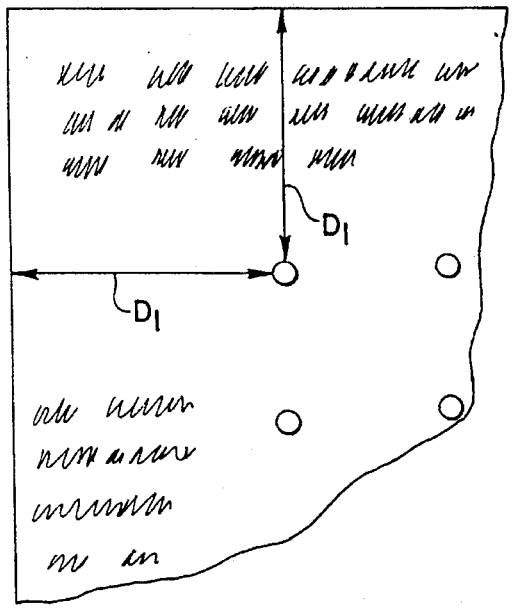
FIG. 8 is a sectional view illustrating the spacing between the pegs and the edge of the board.

As is best seen in FIG. 8, the pegs 16 forming the outer rows and columns of the grid are spaced from the outer edge of the board 14 by a predetermined distance $D_1$ to provide an outer border of undrilled (i.e., pegless) material. Ideally, this distance $D_1$ exceeds the width or diameter of the plates. In the preferred embodiment, plates 24 are circular and have a diameter of 1¾ inches and the predetermined distance $D_1$ is 1⅞ inches. The border permits board 14 to be mounted in any orientation without the plates 24 overhanging the edge of board 14. By contrast, the prior design shown in FIG. 1 could only be used in one orientation because the top row of pegs was positioned too close to the edge of board 14. As shown in FIG. 8, the large border of the present design also provides a space for record keeping and other markings using a water soluble or dry erase marker, for example.

Plates 24 are provided in a plurality of colors and may be divided into identification plates, task plates, status plates, and behavior plates. Preferably, the task, identification, and behavior plates are all the same color, e.g. yellow, and the status plates are a different color. The status plates are further divided into achievement, bonus and penalty plates which are used as described below. Preferably, different colors are used for the different forms of status plates to permit quick visual recognition. For example, achievement plates may be green, bonus plates may be red, and penalty plates may be black. As will be apparent, different color schemes may be selected in accordance with the users' preferences. The kit for the small board includes 8 dozen plates (2 dozen yellow, 2 dozen green, 2 dozen red, 1 dozen black and 1 dozen white), the kit for the medium board includes 14 dozen plates (3 dozen yellow, 4 dozen green, 4 dozen red, 1.5 dozen black and 1.5 dozen white), and the kit for the large board includes 20 dozen plates (4 dozen yellow, 6 dozen green, 6 dozen red, 2 dozen white, and 2 dozen black). However, other colors may readily be used for plates 24.

Plates 24 may be labeled with words or symbols using a marker, stickers, pictures, etc. Preferably plates 24 are constructed from vinyl or polypropylene so that they may be reused after being labeled with a water soluble or dry-erase marker. The identification plates may be marked to identify a specific individual by writing the individual's name or initials on the plate or by attaching his or her picture to the plate. Similarly, the task and behavior plates may be marked with words or symbols representing tasks to be performed and the behaviors to be modified, respectively. The status plates may be marked to indicate the status of a task to be performed or the status of a behavior which is being modified.

Figure 9:
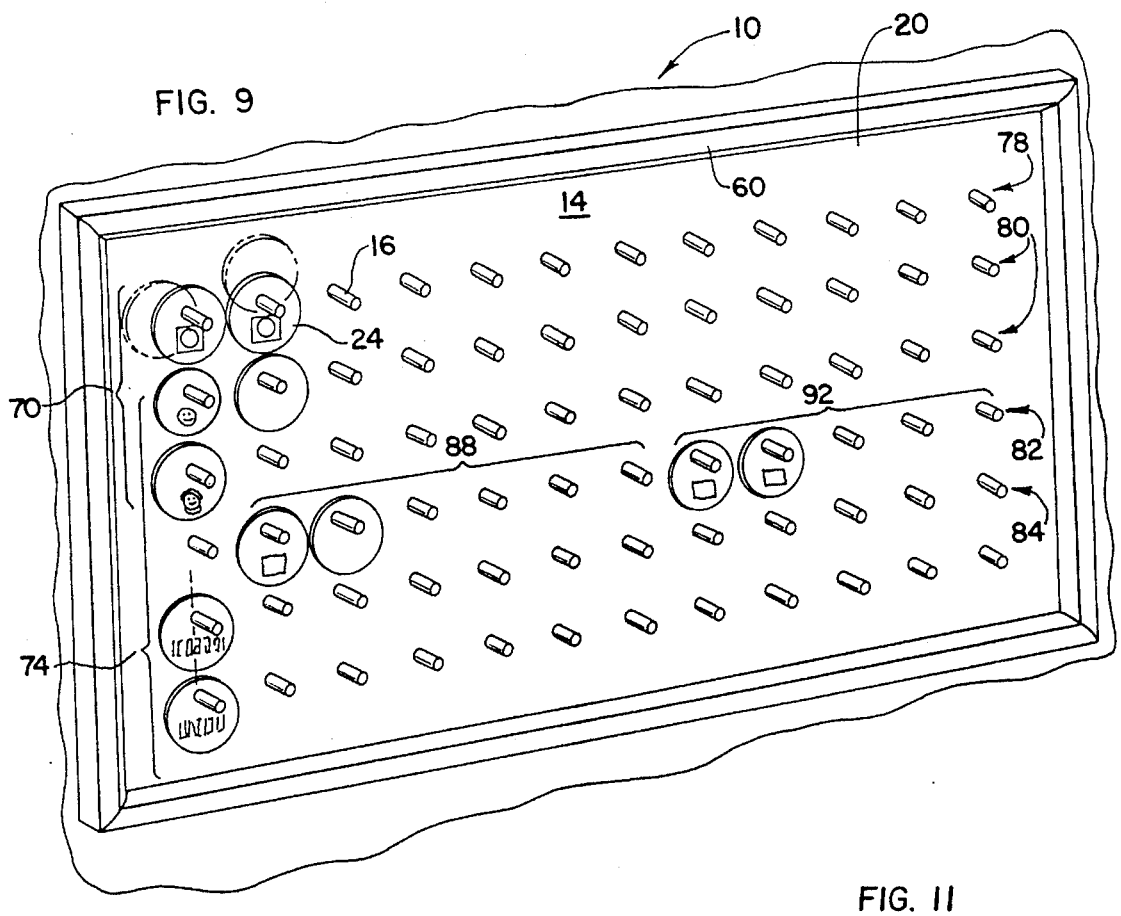
FIG. 9 illustrates a preferred method of using the monitoring device of FIG. 2.

Board 14 may be used in a variety of ways and users may develop different strategies to meet his or her specific needs. A preferred method of using board 14 in connection with children is shown in FIG. 9. As can be seen, board 14 is divided into a task section 70 and a behavior section 74. Task section 70 includes a first row of pegs 78, referred to as a task row, for receiving task plates indicating tasks to be performed. Task section 70 also includes one row 80 of pegs for each individual who is responsible for performing the tasks designated in the task row. These rows can be referred to as assignment rows. The assignment rows 80 are positioned below task row 78 and are designated by placing an identification plate on the outermost peg in a respective row or by assigning the individual a specific color pegs (e.g., a row of red pegs). The latter approach is beneficial for providing anonymity to the child when there are visitors in the house. Status plates are placed on the pegs in the assignment rows 80 to indicate the status of the tasks assigned to a respective individual. In particular, a parent, teacher, etc., places a green achievement plate on the individual's task row to acknowledge completion of the task. The achievement plate should be promptly put on the board to let the individual know that his or her good work is appreciated. Alternatively, a child may place the achievement plate on the peg and the parent can reverse the plate, as explained below, to acknowledge the child's accomplishment.

Similarly, behavior section 74 includes a row of pegs 82, referred to as the behavior row, for receiving behavior plates indicating behaviors to be modified. Behavior section 74 also includes one row 84 of pegs for each individual whose behavior is to be modified. The individual's row 84 are positioned below behavior row 82 and are designated by placing an identification plate on the outermost peg of a respective row or by assigning a specific colored peg. Status plates are placed on the pegs in the individual's row to indicate the status of a respective individual's behavior.

Behavior row 82 can be divided into a first section 88 in which a behavior plates corresponding to existing behaviors are placed and a second section 92 in which behavior plates corresponding to desired behaviors are placed. Preferably, undesirable behavioral traits are balanced by opposite, desirable behavioral traits. For example, "interrupting" can be balanced by "waiting my turn"; "whining" can be balanced by "asking nicely"; "hurting" can be balanced by "helping".

Behavior section 74 is used to correct problems with behavior and attitude. Bonus points are awarded when the individual displays desired behaviors and penalty points are imposed when the individual displays one of the targeted negative behaviors. Red plates are used as bonus plates and black plates are used as penalty plates; however, alternative color schemes can be employed to avoid creating stereotypical color inferences, e.g. "black" is bad. It should be appreciated that behaviors and tasks can be arranged in columns, as opposed to rows as described above.

Pegs 16 come in a variety of colors so that, preferably, each row of pegs is a different color. This provides an attractive design and also allows an individual to quickly identify his or her task and behavior rows.

At least some of the plates 24 are "reversible" as shown in FIG. 4. Plates 24 can be made reversible by placing a first color on one side and a second, "opposite" color on the other side. For example, black reverses to white, red reverses to green. Two-color plates can be formed by laminating two single-color plates together or by sticking a circular decal to one side of a single-color plate.

Plates 24 can also be made reversible by placing opposing words or symbols on opposite sides of a plate 24. For example, a storm cloud with raindrops reverses to sunshine, a stop sign reverses to a go sign, a "no" reverses to a "yes", a plus sign reverses to a minus sign.

The reversible plates can be used in several ways. For example, plates can be reversed from a "negative" to a "positive" status when an individual takes appropriate steps to indicate behavioral and attitude changes. Reversible plates can also be used in connection with variable chores by labeling one side of a task plate, via pictures or words, to indicate tasks to be achieved on week days while labeling the other side to indicate tasks to be achieved on weekend days. The reversibility of a plate can be indicted, for example, by an arrow, by abbreviations(s) on each side of the plate representing the pertinent days of the week, month, etc., or by use of a specific color that signals reversibility.

Figure 6:
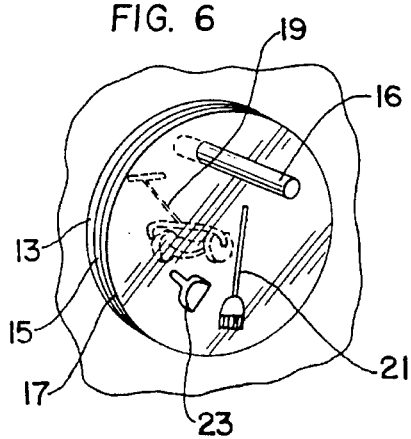
FIG. 6 is a schematic illustration of transparent indicator plates which can be employed in the present invention.

At least some plates 24 are transparent as illustrated in FIG. 6. Transparent plates are beneficial because they can be stacked on a single peg 16 to conserve space on the board. For example, each individual can be assigned a task row, as opposed to using a single task row and a plurality of assignment rows. In such a layout, transparent status/ achievement plates can be placed on the labeled task plate when the task is complete. The status plate can have a small symbol such as a star to make the plate more visible to the individual.

Transparent plates can also be used to build layers of plates representing the steps in a multistep task. In particular, the individual steps are placed on separate plates which can be stacked on a single peg without concealing the lower plates in the stack. For example, the various steps to cleaning a house can each be placed on a separate plate.

AS shown in FIG. 6, a non-transparent plate 13 lies at a distal end of peg 16. Two transparent plates 15, 17 lie atop and proximal to the plate 13. Plate 13 carries a visual indicator 19 of a lawnmower which is visible through plates 15, 17. Transparent plate 15 carries a visual indication 21 of a broom which is visible through the upper or more proximal transparent plate 17. Transparent plate 17 may itself carry visual indication 23 of a dust pan. Thus, the child realizes that his task is to mow the lawn, sweep the sidewalk, and place the grass clippings into the trash. Other transparent plates could be added, for example, a watering can, to show another yard task. Although plate 13 is shown as being non-transparent, it could readily be transparent.

In the above example, visual indications 19, 21, 23 all have a literal correspondence to the respective task step. However, the transparent disk can also be marked with symbolic affirmations for accomplishing individual steps in a multi-component task. This latter approach is especially beneficial when device 10 is used with young children. For example, the plates can be marked with different farm animals, with the child's objective being to accumulate as many farm animals as possible. Alternatively, the plates can be marked with different sandwich ingredients with the child's objective being to build the biggest sandwich.

Transparent plates can also be used to indicate parental or teacher response to an achievement or behavior. For example, when a child places a status plate on a peg to indicate the task is complete, a parent or teacher can each overlay a separate transparent "acknowledgment" plate on the peg to acknowledge the child's accomplishment. The child can readily see that three people, for example, have acknowledged his work. The transparent acknowledgment plate may carry indicators such as A, B, or C, or such as gold star, silver star, etc. Alternatively, a reward may show an ice cream cone.

Figure 10:
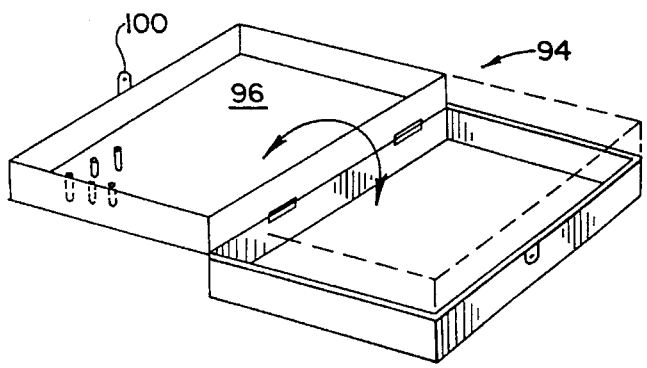
FIG. 10 illustrates a portable version of a monitoring device in accordance with the present invention.

Referring now to FIG. 10, a portable version 94 of the monitoring device 10 is illustrated. The portable version 94 includes a board 96 which is hinged at its center for movement between an open position and a closed position. The board 96 includes an area for storing the plates when they are not being used and during transportation. A latch 100 is provided for locking the board 96 in its closed position.

The portable board 96 can include pegs, as shown in FIG. 10, however, one of several alternative designs is preferably employed to reduce the thickness of the board so it is easier to transport. In particular, FIG. 11 illustrates an embodiment in which the plates 24 slide into slots 102 formed in the front face of the board. The slots 102 are formed by laminating a sheet 104 of flexible material, such as nylon, to a sheet for rigid backing material 106, such as wood.

Figure 12:
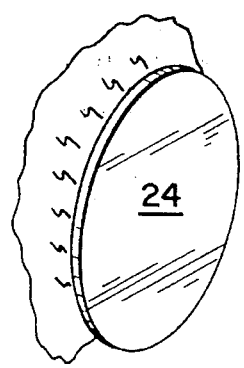
FIG. 12 illustrates the use of indicator plates which are magnetically attached to the monitoring board.

As a second alternative, the plates 24 can be magnetically attachable to the board, as illustrated in FIG. 12. In such embodiment, the plates 24 are constructed from flexible magnet, a/k/a magnetic sheet which is commercially available from the Magnetic Source. This material is generally commercially available from sign making companies and is often used to make "refrigerator" magnets. AS will be appreciated, the board should be constructed from a material which attracts magnets. However, the board can be constructed of paper, for example, which attached to a metal surface such as a refrigerator by the magnetic plates. Instead of pegs, board 14 can include boxes arranged in a grid and delineated by permanent or removable lines marked on board 14. As will be appreciated, the magnetic disks can be stacked on top of each other.

Figure 13:
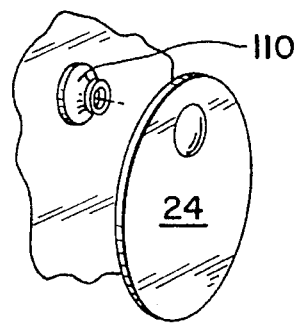
FIG. 13 illustrates the use of indicator plates which snap onto the monitoring board.
Figure 14:
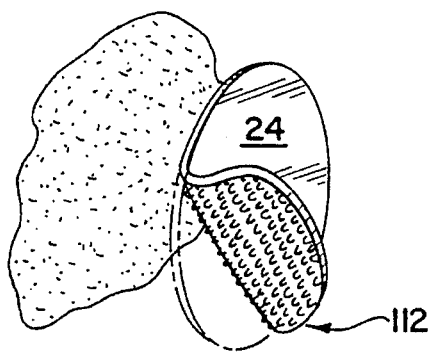
FIG. 14 illustrates the use of Velcro® to connect the plate 24 to the board 14.

As still another alternative, the plates 24 can be adapted to snap onto raised rivets 110 formed on the front face of the board, as illustrated in FIG. 13. In such a design, the rivets, and the board are integrally molded from a material such as PVC and the plates are molded from a like material. As still another alternative, the plates can be formed from static cling vinyl which is commercially available from Transilwrap. This embodiment is symbolically represented by FIG. 12. FIG. 14 illustrates yet another alternative in which Velcro® connectors 112 are used to connect the plates to the board.

Figure 15:
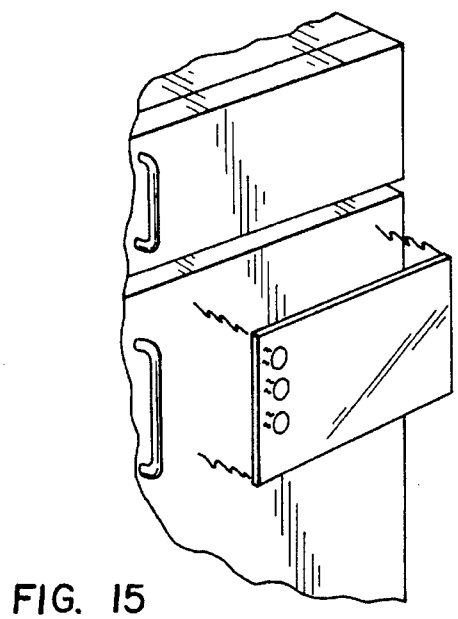
FIG. 15 illustrates a board which can be magnetically attached to a metallic surface such as a refrigerator door.
Figure 16:
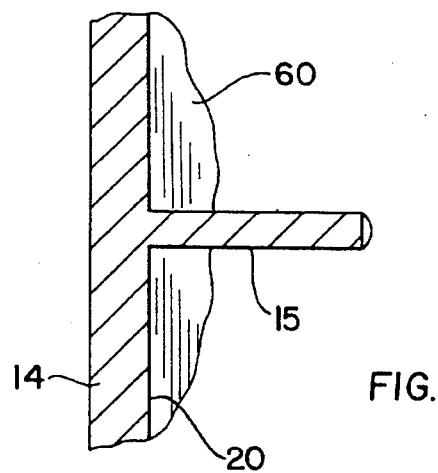
FIG. 16 illustrates an embodiment of the present invention in which the pegs are integrally formed with the board.

It should be appreciated that the designs shown in FIGS. 11–14 can also be used with the wall-mounted board 14, as opposed to the portable board 96. In addition, when magnetized plates are employed, the board can also be constructed from a magnetic sheet or flexible magnet so it can be magnetically attached to a refrigerator, for example. (See FIG. 15).

The applicant has found that an effective training system requires: (1) defining clear expectations; (2) setting attainable goals; (3) providing generous affirmation (with appropriate rewards) for desired behavior; and (4) providing gentle reproof (with appropriate consequences) for bad behavior. The device described herein helps put these principles into practice. In particular, the device allows the trainer to define expectations using behavior and task plates. These expectations are laid out in an orderly, easy to understand fashion using the grid network of pegs. To be effective, the expectations should be clearly understood by the child. He or she should know what is required to complete a task or what constitutes "quarrelling", for example.

The task and behavior plates allow the trainer to set goals which are attainable by a particular individual. Because the plates are reusable, they can be custom tailored to meet the needs of a variety of individuals.

Finally, the status plates provide a mechanism for rewarding good behavior and penalizing bad behavior. To be effective, the trainer should provide verbal affirmation when achievement and bonus plates are awarded. By contrast, penalties for negative behavior should be gentle and loving. The penalty plates provide a "gentle" mechanism for acknowledging undesirable behavior. When reversible plates are employed, status plates 24 can be used to acknowledge a change of attitude.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A behavior training and modification device, comprising:

a board having a front face;

a plurality of pegs extending outwardly from said front face of said board and being arranged in a predetermined pattern;

a first set of indicator plates being marked to provide a visual indication, each of said indicator plates including an aperture sized to slidably engage onto said pegs;

a second set of indicator plates each indicator plate in said second set having a transparent area, an indicator area, and an aperture sized to slidably engage onto said pegs; and wherein when indicator plates from said second set are stacked onto a peg proximal to an indicator plate from said first set, the visual indication on the indicator plate from said first set is visible through the transparent areas of the plates from said second set stacked on said peg.

2. A behavior training device as set forth in claim 1, wherein said pegs are equally spaced horizontally and vertically from one another and arranged to form a grid of rows and columns.

3. A behavior training and modification device as set forth in claim 1 wherein when a plurality of plates from said second set of plates are stacked on a peg, the indicator areas of the lower plates in the stack are visible through the transparent areas of the upper plates in the stack.

4. A behavior training and modification device as set forth in claim 2, wherein further comprise:

i) at least one identification plate markable to identify a specific individual;

ii) a plurality of task plates, each task plate being markable to identify a task to be performed;

iii) a plurality of status plates for indicating the status of a task to be performed; and said board including a task section comprising:
i) a first row of pegs for receiving task plates indicating tasks to be performed; and
ii) one assignment row of pegs for each individual responsible for performing the tasks designated in said first row of pegs, said assignment rows being positioned below said first row and being designated by placing an identification plate on the outermost peg in a respective row; and wherein said status plates are placed on the pegs in said assignment rows to indicate the status of the tasks assigned to a respective individual.

5. A behavior training and modification device as set forth in claim 4, wherein:

said indicator plates further comprise:

i) at least one identification plate marked to identify a specific individual;

ii) a plurality of behavior plates, each behavior plate being marked to identify a behavior to be modified;

iii) a plurality of status plates for indicating the status of behaviors to be modified;

said board includes a behavior section comprising:
i) a first row of pegs for receiving behavior plates indicating behaviors to be modified; and
ii) one behavior row of pegs for each individual whose behavior is to be modified, said behavior rows being positioned below said first row and being designated by placing an identification plate on the outermost peg of a respective row; and wherein said status plates are placed on the pegs in said behavior row for indicating the status of a respective individual's behavior.

6. A behavior modification and training device as set forth in claim 5, wherein said behavior row is divided into a first section in which behavior plates corresponding to existing behaviors are placed and a second section in which behavior plates corresponding to desired behaviors are placed.

7. A behavior training and modification device as set forth in claim 2, wherein said plates are disk shaped.

8. A behavior training and modification device as set forth in claim 2, wherein at least some of said plates are transparent.

9. A behavior training and modification device as set forth in claim 2, wherein said pegs are angled upwardly with respect to the front face of said board.

10. A behavior training and modification device as set forth in claim 2, wherein said pegs are integrally formed with said board.

11. A behavior training and modification device as set forth in claim 2, further comprising a frame formed around the outer edge of said board.

12. A behavior training and modification device as set forth in claim 2, wherein at least some of said plates have a first color on one side and a second color on the other side.

13. A behavior training and modification device as set forth in claim 2, wherein said plates have a diameter of approximately 1¾".

14. A behavior training and modification device as set forth in claim 2, wherein said peg board includes a plurality of apertures formed in said front face at even intervals; and wherein said pegs are removably insertable into said apertures.

15. A behavior training and modification device as set forth in claim 2, wherein one end of each peg includes a transverse slot.

16. A behavior training and modification device as set forth in claim 15, wherein said peg board includes a plurality of apertures formed in said front face at even intervals; and wherein said pegs are removably insertable into said apertures.

* * * * *